(12) United States Patent
Pham et al.

(10) Patent No.: US 11,933,386 B2
(45) Date of Patent: Mar. 19, 2024

(54) ANTI-BACKLASH MECHANISM FOR ELECTROMECHANICAL LINEAR ACTUATOR

(71) Applicant: Lin Engineering, Inc., Morgan Hill, CA (US)

(72) Inventors: Hung H. Pham, San Jose, CA (US); Harlan H. Nguyen, San Jose, CA (US)

(73) Assignee: Lin Engineering, Inc., Morgan Hill, CA (US)

(*) Notice: Subject to any disclaimer, the term of this patent is extended or adjusted under 35 U.S.C. 154(b) by 126 days.

(21) Appl. No.: 17/863,391

(22) Filed: Jul. 13, 2022

(65) Prior Publication Data

US 2023/0349452 A1 Nov. 2, 2023

Related U.S. Application Data

(60) Provisional application No. 63/336,160, filed on Apr. 28, 2022.

(51) Int. Cl.
*F16H 25/20* (2006.01)
*F16H 57/04* (2010.01)

(52) U.S. Cl.
CPC ..... *F16H 25/2009* (2013.01); *F16H 57/0464* (2013.01); *F16H 57/0497* (2013.01); *F16H 2025/2075* (2013.01)

(58) Field of Classification Search
CPC ............. F16H 25/2009; F16H 57/0464; F16H 57/0497; F16H 2025/2075; F16H 25/2003
See application file for complete search history.

(56) References Cited

U.S. PATENT DOCUMENTS

| | | | |
|---|---|---|---|
| 4,433,590 A | 2/1984 | Benoit et al. | |
| RE32,433 E * | 6/1987 | Erikson | F16H 25/2009 411/262 |
| 4,683,767 A | 8/1987 | Weyer | |
| 5,913,940 A | 6/1999 | Erikson et al. | |
| 6,131,478 A | 10/2000 | Erikson et al. | |

(Continued)

OTHER PUBLICATIONS

Printout: Christopher Nook, "Selection of Anti-Backlash Nuts in Linear Motion Systems", https://www.helixlinear.com/blog/lead-screws/selection-of-anti-backlash-nuts-in-linear-motion-systems, 15 pages.

*Primary Examiner* — Terence Boes
(74) *Attorney, Agent, or Firm* — Mark Protsik; Thomas Schneck

(57) ABSTRACT

A radial-type anti-backlash nut for use upon linear actuator leadscrews uses a separate housing resting upon the actuator's main nut. The anti-backlash action is a multi-finger collet and spring setup located inside the housing. The collet tapers radially inward toward tips of the fingers at a specified taper angle. The whole interior length of an internal thread of the collet engages an external thread of the leadscrew. The housing is a pre-load nut with an internal tapered surface that mates with the collet fingers with substantially the same taper angle. The pre-load nut, when screwed onto external threads of the adjustment nut, both compresses a load spring and applies radially inward adjustable load force to the collet fingers against the leadscrew. Three tolerances adjust load: the taper angle of the main nut's collet fingers, the spring load's compression, and the collet finger mismatch with respect to the lead screw.

8 Claims, 4 Drawing Sheets

(56) References Cited

U.S. PATENT DOCUMENTS

| | | |
|---|---|---|
| 6,142,032 A | 11/2000 | Creager |
| 6,467,362 B2 | 10/2002 | Erikson et al. |
| 8,266,976 B2 | 9/2012 | Waide |
| 8,496,204 B1 | 7/2013 | Charafeddine et al. |
| 9,618,104 B2 | 4/2017 | Kahnert |
| 9,765,866 B2 | 9/2017 | Samsfort |
| 9,964,201 B2 | 5/2018 | Lin et al. |
| 10,738,865 B2 | 8/2020 | Levin et al. |
| 11,105,366 B2 | 8/2021 | Knight et al. |
| 11,198,501 B2 | 12/2021 | Ricard et al. |
| 2021/0404507 A1 | 12/2021 | Zeng et al. |

\* cited by examiner

ANTI-BACKLASH MECHANISM FOR ELECTROMECHANICAL LINEAR ACTUATOR

CROSS-REFERENCE TO RELATED APPLICATION

This application claims priority under 35 U.S.C. 119(e) from U.S. Provisional Application 63/336,160, filed Apr. 28, 2022.

TECHNICAL FIELD

The invention relates to machine elements or mechanisms of the gearing type, and more particularly to screw-and-nut mechanisms with arrangements or adjustments for taking-up backlash (i.e., anti-backlash nuts), with special attention to improvements in such mechanisms to provide both increased axial stiffness and radial play reduction with consistent load setting for use in linear actuators.

BACKGROUND ART

An electromechanical linear actuator typically comprises (1) a rotary electric motor that is coupled to (2) a lead screw to translate the rotary motion of the motor into linear motion of the lead screw. The rotary electric motor may be configured with a hollow shaft and internal threads that function as the primary support for the lead screw. The lead screw is externally threaded to engage with the internal threads of the electric motor.

When the rotary motor in such a linear actuator reverses the direction of its rotation, because of some necessary slack between the internal and external thread engagement the motion the lead screw itself will not immediately reverse the direction of its linear motion, unless (3) an anti-backlash mechanism or nut, is also included to apply a continuous longitudinal force that keeps the internal and external threads in contact. All lead screws need clearance between the screw and the nut to operate, and backlash is the relative axial movement between the nut and the screw without rotation of either one. A typical anti-backlash mechanism comprises several members that include a primary member which is internally threaded to engage with the lead screw, and support members, usually using a spring-type device, to apply the continuous longitudinal force.

There are several different types of anti-backlash mechanism, including axial, radial, and torsional types. (A) Axial anti-backlash nuts simply consist of two nut halves biased against opposite flank angles with a compression (alt., tension) spring. A main nut body and a secondary ring share the same thread form, and there is a spring between the two components that force each part against opposing flanks of the screw thread. This spring biasing takes up the clearance between all the components to get rid of the backlash. (B) Radial anti backlash nuts have a nut body with flexible collet fingers that close to squeeze the threads of the nut into the flank angle of the lead screw, removing the backlash. An accompanying compression spring pushes a ring along the nut body. There can be ramp features on the ends of the fingers that the ring uses to push the fingers inward with constant pressure towards the screw. The threads on the fingers are pushed into the valleys of the screw thread to take up any clearance. There is a mechanical advantage provided by the ramp features between the fingers and the collar, which amplify the force of the spring. (C) In a torsional anti-backlash nut, a spacer that separates the two nut halves automatically adjusts with the use of a torsion spring to lengthen and take up the gap, so the nut maintains zero backlash with very little drag torque. Each basic anti-backlash nut type has its own advantages and disadvantages in terms of load capacity, drag torque, stiffness, vibration damping, linear accuracy (lead error), bidirectional repeatability, wear compensation, cost, etc.

U.S. Pat. No. 9,964,201 to Lin et al. describes a lubrication reservoir for a lead screw assembly that also doubles as an anti-backlash nut (of the axial type). The anti-backlash nut is formed by first and second tubular members separated by an annular spacer and a spring washer.

U.S. Pat. No. 9,765,866 to Samsfort describes a backlash-free spindle nut with an elastic spring washer element between first and second nut parts to generate an axial preload. According to that patent, the preload can be adjusted through a relative twisting of the nut parts followed by a locking in position through abutting gear faces.

U.S. Pat. No. 6,142,032 to Crager describes an axial-type anti-backlash nut with a spring disposed between primary and secondary nuts. Here those active elements are situated within a housing, and an adjustment member connected to that housing adjusts the preload of the spring.

U.S. Pat. Nos. 5,913,940 and 6,240,798 to Erikson et al. describe an anti-backlash nut (of the radial type) with graduated thread depth longitudinal flexure members or fingers. The flexure members or fingers are continuously biased inward against a lead screw by a sleeve that acts upon outer ramps on the flexure members. Because of the way the ramps are arranged to expand outward, the fingers tend to engage the lead screw only near their tips. In the '798 patent, a reinforcing spline structure in the interior of the sleeve imparts tangential rigidity to the longitudinal flexure members.

The effectiveness of the anti-backlash action is dependent on the motor assembly and its supporting construction. A motor assembly tolerant to a high spring force capability would allow for its use in a greater number of applications. With anti-backlash mechanisms, the final force set on the linear actuator is often estimated with XX degree of error due to a fixed locking location and a number of tolerances that contribute to the spring gap. This often leads to a wider range of acceptable forces before the anti-backlash mechanism.

When the linear actuator operates at high speed, there is a critical speed that can be calculated to determine the maximum rotational speed of a lead screw system. The critical speed is determined by the following equation:

$$N_k = k*d_n*(1/l_s^2)*10^7 (\text{min}^{-1})$$

where:
 $N_k$: the critical speed in RPM;
 $d_n$: nominal diameter;
 $l_s$: the unsupported length; and
 k: a support bearing factor.
The support bearing factor depends upon the specific type of support provided by the anti-backlash mechanism:
 k=0.36 for one end fixed, one end free
 k=1.00 for both ends simple
 k=1.47 for one end fixed, one end simple
 k=2.23 for both ends fixed
From the equation, the unsupported length reduces the critical speed exponentially, and the use of different support types can result in a 6-fold difference in critical speeds. Traditional linear actuator designs only support the lead-screw at the nut location. Other designs have used secondary support methods, but encountered issues with excessive friction, leading to no improvement in critical speed.

Manufacturing tolerances can also have an impact on the maximum critical speed. The lead screw, as produced, will have a runout often directly proportional to the length. The runout, or sagging effect, will cause additional vibration/friction, reducing actuator thrust performance and limiting the critical speed of the system.

Summary Disclosure

This invention provides an improved radial-type anti-backlash mechanism or nut for use upon linear actuator lead screws. The anti-backlash integration involves using a separate housing material resting on the actuator's main rotating nut. The anti-backlash action is a traditional multi finger collet and spring setup, however now located on the inside of the housing. This allows for an adjustable spring load that can be set to provide more consistent performance. Three tolerances control the adjustable load: the taper angle of the main nut's collet fingers, the compression of the spring load, and the collet finger mismatch with respect to the lead screw. Instead of just the ends or tips of the collet fingers, the whole interior length of the collet clamps to the lead screw. The 3-tolerances system with slot opening for preload adjustment is considered an invention.

To summarize some of the possibilities:
1. The anti-backlash mechanism is integrated with the support.
2. Any number of additional supports is possible, such that the formula is followed.
3. Any number of splits (and corresponding number of collet fingers) in the support can be used, although three fingers are typical.
4. The taper angle of the collet can vary from 10° to 30°. A smaller taper angle increases the length of the collet's engagement with the lead screw and gives more refined control over the preload adjustment. A larger taper allows the anti-backlash mechanism to be shorter.
5. Optimization for high critical speed, cost, or some balance of these or any other performance factor is determined in part by the material chosen. For example, both the main nut and pre-load nut can be an injection-molded wear-resistant plastic, while the adjustment nut and other parts can be metal.
6. A vent hole in the main nut allows for grease injection for lubricating the lead screw. Any lubricant can be used. The main nut and collet can also be made from a low-friction material, such as PTFE.

Advantages include reduced radial play, which increases thrust capability; increased critical speeds with superior heat dissipation; consistent preload adjustment and increased axial stiffness; and ease of assembly and setting of the adjustable load. Load can be reset as needed.

DETAILED DESCRIPTION

Figure 1:
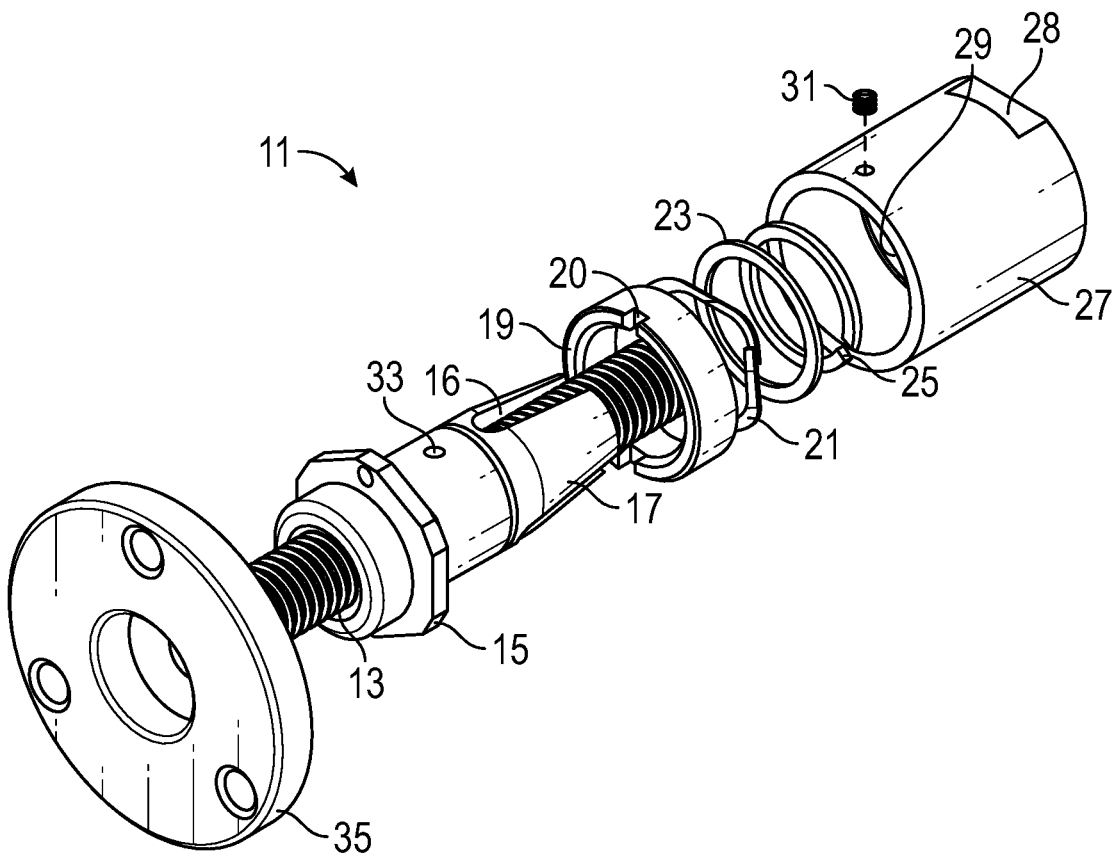
FIG. 1 is an exploded perspective view of a first embodiment of an anti-backlash nut on a leadscrew.
Figure 2:
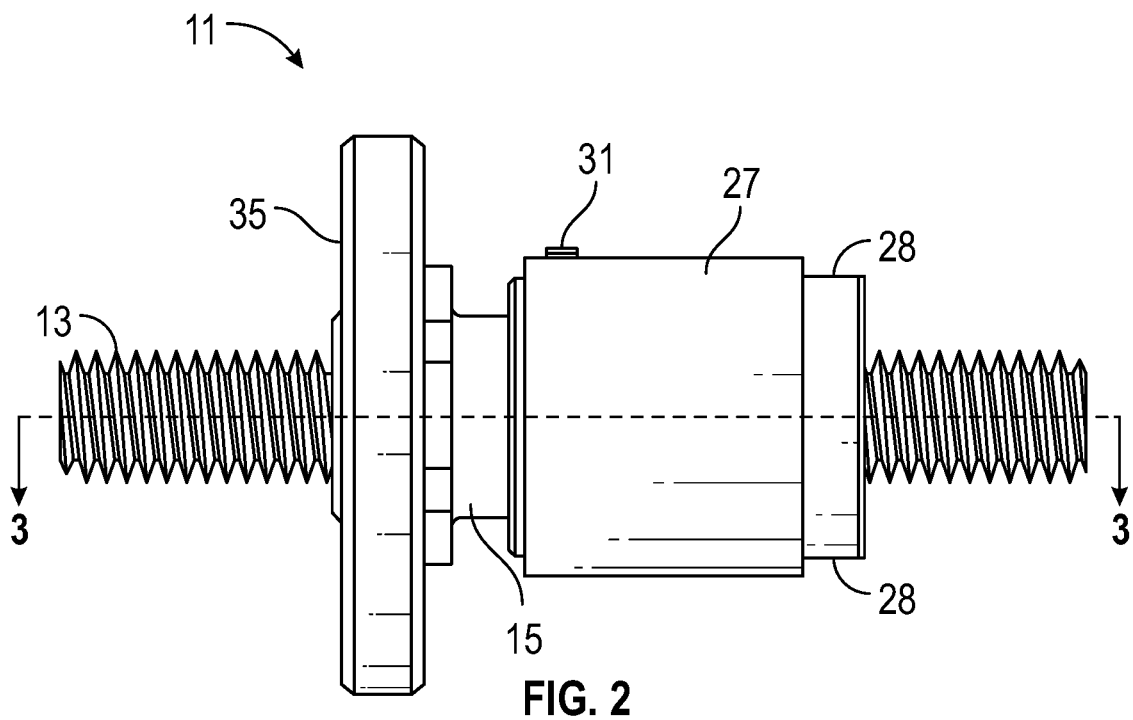
FIG. 2 is an assembled side view of the anti-backlash nut on a leadscrew of FIG. 1.

With reference to FIGS. 1 and 2, an anti-backlash nut 11 engages a leadscrew 13. The anti-backlash nut 11 includes a main nut 15, an adjustment nut 19 engaged by a load spring 21, and a pre-load nut 27 that houses the main nut 15, adjustment nut 19, load spring 21 and other elements (e.g., precision shim 23 and retaining ring 25). A mounting flange 35 may be attached at a first end of the main nut 15.

The main nut 15 has a set of longitudinal slots 16, usually three in number, forming an equal number of fingers 17 at a second end of the main nut 15. The main nut 15 with its collet fingers 17 are provided with an internal thread 16 for engaging with an external thread of the leadscrew 13, as seen especially in FIG. 3. In particular, the fingers 17 are tapered radially inward toward their tips to form a collet that interacts with the adjustment nut 19. The adjustment nut 19 fits over the collet fingers 17 and, as it is pushed by the load spring 21 toward the first end of the main nut 15, the adjustment nut 19 supplies a radially inward force upon the collet fingers 17 against the leadscrew 13.

The taper is at a specified taper angle, typically in a range of 10° to 30°. A shallower angle provides a greater amount of control over the anti-backlash action of the collet fingers 17 at the expense of needing a longer nut 15 overall. A steeper taper angle shortens the main nut significantly, but then a short movement of the adjustment nut 19 leads to a greater pushing upon the collet fingers 17 for less control. A taper angle of about 20° is about right, but any amount within the range is acceptable.

The adjustment nut 19, the annular load spring 21, the annular precision shim 23, and the retaining ring 25 sequentially fit over the collet 17 against the main nut 15. The adjustment nut 19, annular load spring 21 and annular precision shim 23 have a degree of longitudinal play between the main nut 15 and retaining ring 25.

A pre-load nut 27 with an internal tapered surface mates with the collet fingers. Specifically, the internal tapered surface has a specified taper angle that substantially matches that of the collet fingers. If the taper of the collet fingers are 10°, then the internal taper angle of the pre-load nut 27 is also 10°, if the collet taper is 20°, then the pre-load nut 27 likewise has an internal taper of 20°, etc. As seen in FIG. 1, but especially FIG. 4, the taper surface in the interior of the pre-load nut 27 terminates in a radially inward back shelf 29 against which the load spring 21, precision shim 23 and retaining ring 25 can be seated. The pre-load nut 27 houses the annular load spring 21 and annular precision shim 23 when screwed onto external threads of the adjustment nut 19 by an amount that both compresses the load spring 21 and applies radially inward force to the collet fingers 17 against the leadscrew 13 with an adjustable load dependent upon the amount that the pre-load nut 27 is screwed down upon the adjustment nut 19. An anti-rotation set screw 31 passes through a radial screw hole through the pre-load nut 27 and contacts a notch 20 in the adjustment nut 19. The set screw 31 engages with the adjustment nut once the pre-load nut 27 has been screwed down by a set amount, fixing the amount of anti-backlash force.

Figure 3:
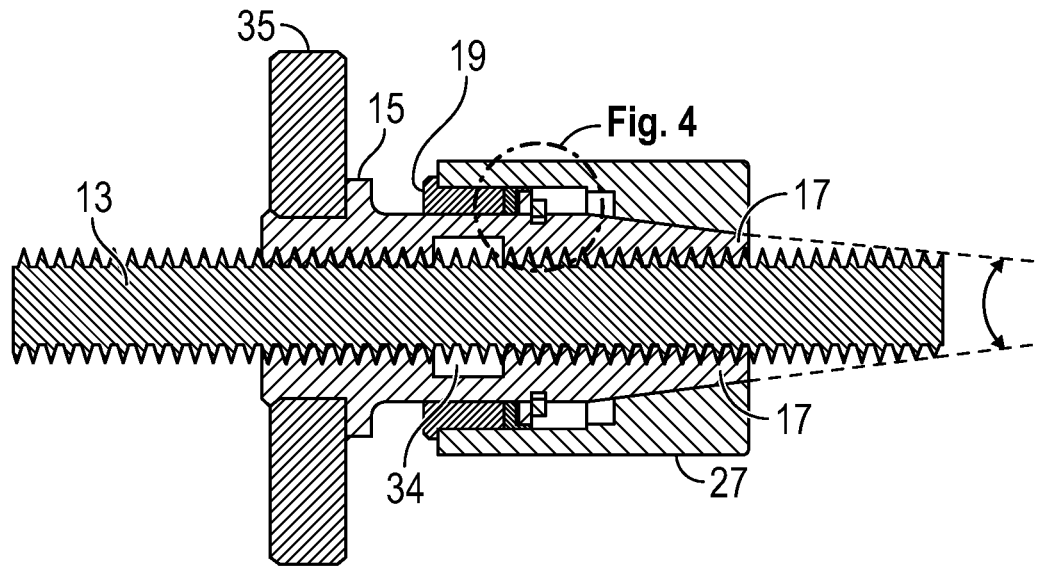
FIG. 3 is a side sectional view taken along the line A-A in FIG. 2.
Figure 4:
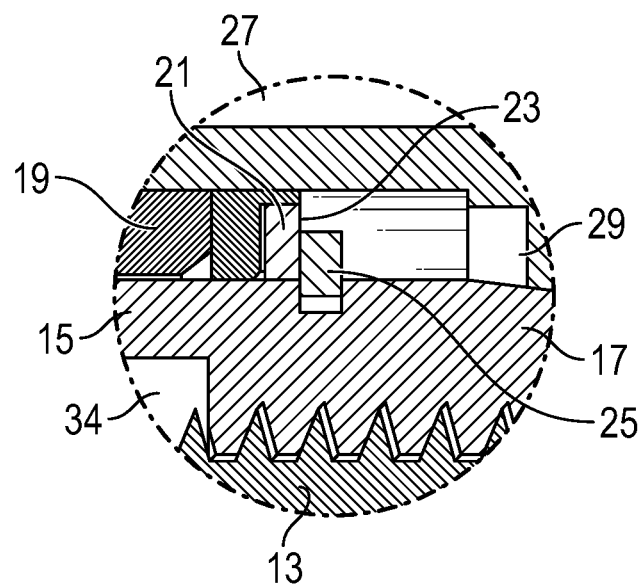
FIG. 4 is a close-up detail view taken within the circle B in FIG. 3.
Figure 5:
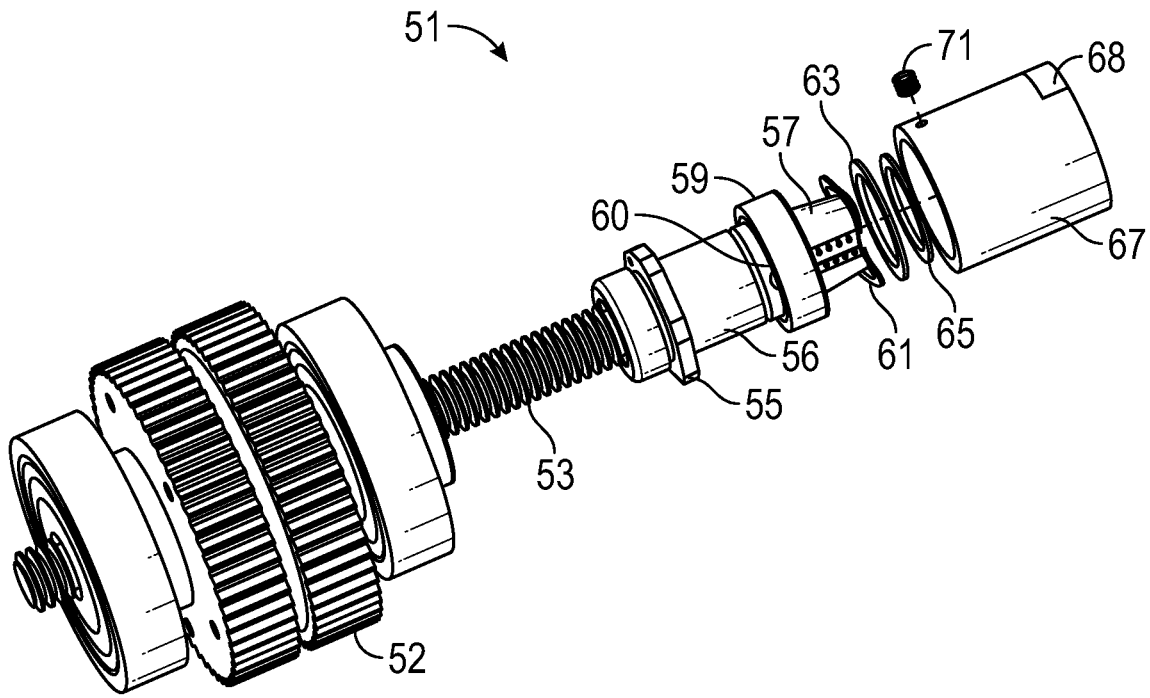
FIG. 5 is an exploded perspective view of a second embodiment of an anti-backlash mechanism.
Figure 6:
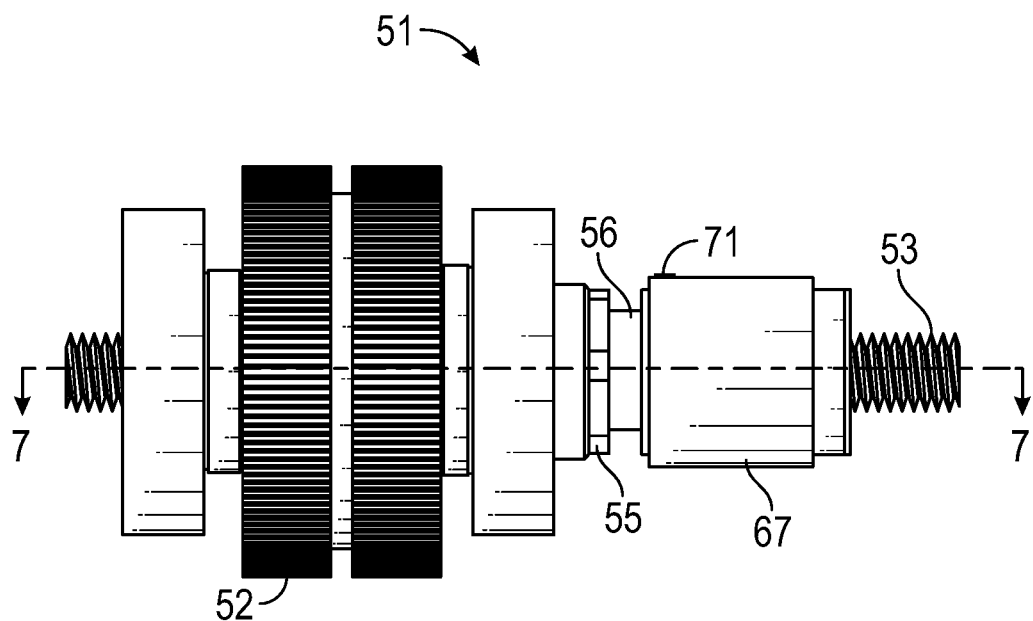
FIG. 6 is an assembled side view of the anti-backlash mechanism of FIG. 5.

The interior of the main nut 15 also has a grease reservoir 34 between the nut's first end and the beginning of taper in the collet fingers 17, as seen in FIGS. 3 and 4. A vent hole 33 may be provided, as seen in FIG. 1, for grease injection from the nut's exterior into the internal reservoir 34. This reservoir is in fluid communication with the lead screw 13.

In the embodiment of FIGS. 1-4, a mounting flange 35 is attached to an exterior of the main nut 15.

With reference to FIGS. 5-8, in an alternative embodiment a leadscrew 53 engages with internal threads of a hollow shaft in a rotary motor 55. The anti-backlash nut 51 itself acts in a similar manner to that in FIGS. 1-4. In particular, the anti-backlash nut 51 includes a main nut 55, an adjustment nut 59 engaged by a load spring 61, and a pre-load nut 67 that houses the main nut 55, adjustment nut 59, load spring 61 and other elements (e.g., precision shim 63 and retaining ring 65).

Again, the main nut 55 has a set of longitudinal slots, usually three in number, forming an equal number of fingers 57 at a second end of the main nut 55. The main nut 55 with its collet fingers 57 are provided with an internal thread 56 for engaging with an external thread of the leadscrew 53, as seen especially in FIG. 7. In particular, the fingers 57 are tapered radially inward toward their tips to form a collet that interacts with the adjustment nut 59. The adjustment nut 59 fits over the collet fingers 57 and, as it is pushed by the load spring 61 toward the first end of the main nut 55, the adjustment nut 59 supplies a radially inward force upon the collet fingers 57 against the leadscrew 15. Again, the taper angle is typically in a range of 10° to 30°.

Figure 8:
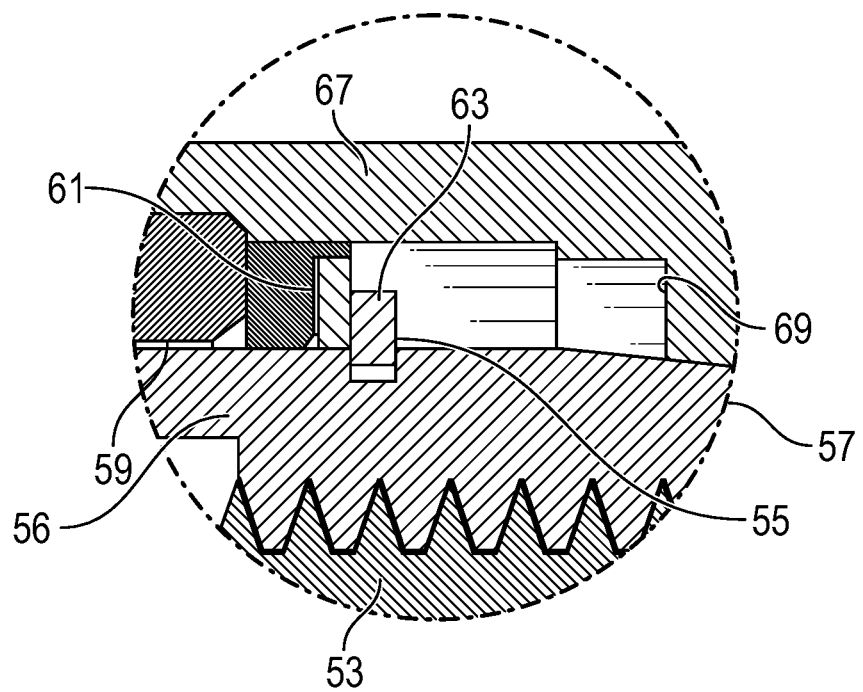
FIG. 8 is a close-up detail view taken within the circle B in FIG. 7.

The adjustment nut 59, the annular load spring 61, the annular precision shim 63, and the retaining ring 65 sequentially fit over the collet 67 against the main nut 55. The adjustment nut 59, annular load spring 61 and annular precision shim 63 have a degree of longitudinal play between the main nut 15 and retaining ring 65. A pre-load nut 67 with an internal tapered surface mates with the collet fingers. Again, the internal tapered surface has a specified taper angle that substantially matches that of the collet fingers 57. As seen in FIG. 8, the taper surface in the interior of the pre-load nut 67 terminates in a radially inward back shelf 69 against which the load spring 61, precision shim 63 and retaining ring 65 can be seated. The pre-load nut 67 houses the annular load spring 61 and annular precision shim 63 when screwed onto external threads of the adjustment nut 59 by an amount that both compresses the load spring 61 and applies radially inward force to the collet fingers 57 against the leadscrew 53 with an adjustable load dependent upon the amount that the pre-load nut 67 is screwed down upon the adjustment nut 59. An anti-rotation set screw 71 passes through a radial screw hole through the pre-load nut 67 and contacts a notch 60 in the adjustment nut 59. The set screw 71 engages with the adjustment nut 59 once the pre-load nut 67 has been screwed down by a set amount, fixing the amount of anti-backlash force.

Figure 7:
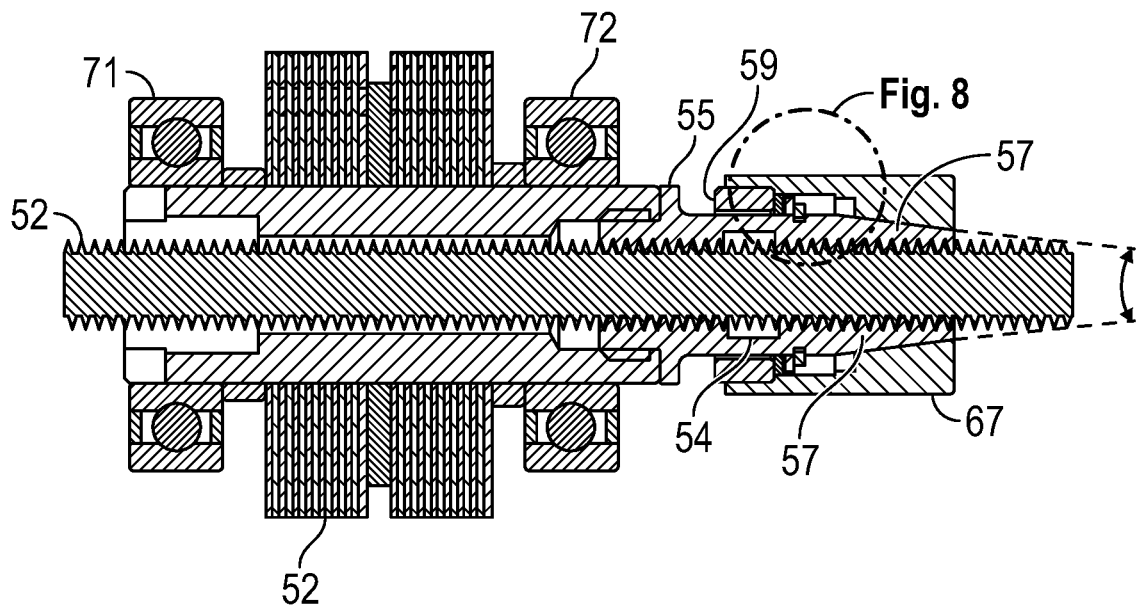
FIG. 7 is a side sectional view taken along the line A-A in FIG. 6.

The interior of the main nut 55 also has a grease reservoir 74 between the nut's first end and the beginning of taper in the collet fingers 57, as seen in FIG. 7. A vent hole may again be provided for grease injection from the nut's exterior into the internal reservoir 74. This reservoir is in fluid communication with the lead screw 53.

Bearings 72 allow the unit to rotate freely as directed by the motor 52.

What is claimed is:

1. An anti-backlash mechanism for engaging with a leadscrew, comprising:
   a main nut having an integral or attached collet with a set of longitudinal slits forming fingers, the collet tapering radially inward toward tips of the fingers at a specified taper angle, the main nut and collet provided with an internal thread for engaging with an external thread of the leadscrew;
   an adjustment nut, annular load spring, annular precision shim, and retaining ring sequentially fitting over the collet against the main nut, the adjustment nut, annular load spring and annular precision shim having a degree of longitudinal play between the main nut and retaining ring; and
   a pre-load nut with an internal tapered surface that mates with the collet fingers, the internal tapered surface having a specified taper angle that substantially matches that of the collet fingers, the pre-load nut housing the annular load spring and annular precision shim when screwed onto external threads of the adjustment nut by an amount that both compresses the load spring and applies radially inward force to the collet fingers against the leadscrew with an adjustable load dependent upon the amount that the pre-load nut is screwed down upon the adjustment nut.

2. The anti-backlash mechanism as in claim 1, wherein a mounting flange is attached to an exterior of the main nut.

3. The anti-backlash mechanism as in claim 1, wherein the leadscrew engages with internal threads of a hollow shaft in a rotary motor.

4. The anti-backlash mechanism as in claim 1, wherein the main nut has an interior grease reservoir in fluid communication with the lead screw.

5. The anti-backlash mechanism as in claim 1, wherein the pre-load nut has a radial hole with an anti-rotation set screw that engages with the adjustment nut once the pre-load nut has been screwed down by a set amount.

6. An anti-backlash mechanism for engaging with a leadscrew, the leadscrew engaging with internal threads of a hollow shaft in a rotary motor, comprising:
   a main nut, mounted to bearings of the rotary motor, having an integral or attached collet with a set of longitudinal slits forming fingers, the collet tapering radially inward toward tips of the fingers at a specified taper angle, the main nut and collet provided with an internal thread for engaging with an external thread of the leadscrew;
   an adjustment nut, annular load spring, annular precision shim, and retaining ring sequentially fitting over the collet against the main nut, the adjustment nut, annular load spring and annular precision shim having a degree of longitudinal play between the main nut and retaining ring; and
   a pre-load nut with an internal tapered surface that mates with the collet fingers, the internal tapered surface having a specified taper angle that substantially matches that of the collet fingers, the pre-load nut housing the annular load spring and annular precision shim when screwed onto external threads of the adjustment nut by an amount that both compresses the load spring and applies radially inward force to the collet fingers against the leadscrew with an adjustable load dependent upon the amount that the pre-load nut is screwed down upon the adjustment nut.

7. The anti-backlash mechanism as in claim 6, wherein the main nut has an interior grease reservoir in fluid communication with the lead screw.

8. The anti-backlash mechanism as in claim 6, wherein the pre-load nut has a radial hole with an anti-rotation set screw that engages with the adjustment nut once the pre-load nut has been screwed down by a set amount.

* * * * *